United States Patent
Wood

(10) Patent No.: US 9,487,287 B2
(45) Date of Patent: Nov. 8, 2016

(54) WING LEADING EDGE VENTING

(75) Inventor: Norman Wood, Sutton Benger (GB)

(73) Assignee: Airbus Operations Limited, Bristol (GB)

( * ) Notice: Subject to any disclaimer, the term of this patent is extended or adjusted under 35 U.S.C. 154(b) by 746 days.

(21) Appl. No.: 13/558,761

(22) Filed: Jul. 26, 2012

(65) Prior Publication Data
US 2013/0048794 A1   Feb. 28, 2013

(30) Foreign Application Priority Data

Aug. 22, 2011 (GB) .................................. 1114433.4

(51) Int. Cl.
*B64C 21/06* (2006.01)
*B64C 21/04* (2006.01)
*B64C 21/02* (2006.01)

(52) U.S. Cl.
CPC ............ *B64C 21/025* (2013.01); *B64C 21/06* (2013.01); *B64C 2230/20* (2013.01); *Y02T 50/166* (2013.01)

(58) Field of Classification Search
CPC ..... B64C 21/025; B64C 21/06; B64C 21/08; B64C 2230/20; B64C 2230/22; B64C 21/04
See application file for complete search history.

(56) References Cited

U.S. PATENT DOCUMENTS

| | | | | |
|---|---|---|---|---|
| 2,111,530 A * | 3/1938 | De Seversky | | 244/209 |
| 2,267,927 A * | 12/1941 | Kightlinger | | 244/200 |
| 2,464,663 A * | 3/1949 | Zingg | | 244/12.1 |
| 2,650,781 A | 9/1953 | Taylor | | |
| 2,833,492 A * | 5/1958 | Fowler | | 244/209 |
| 3,194,518 A * | 7/1965 | Walsh | | 244/130 |
| 3,366,348 A * | 1/1968 | Lemoigne | | 244/200 |
| 3,889,903 A * | 6/1975 | Hilby | | B64C 21/04 244/124 |
| 3,951,360 A * | 4/1976 | Anxionnaz | | 244/209 |
| 3,974,986 A * | 8/1976 | Johnstone | | B64C 23/06 244/130 |
| 4,114,836 A * | 9/1978 | Graham et al. | | 244/1 N |
| 4,666,104 A * | 5/1987 | Kelber | | 244/12.1 |
| 4,726,548 A * | 2/1988 | Clites | | 244/209 |
| 4,813,631 A | 3/1989 | Gratzer | | |
| 5,167,387 A * | 12/1992 | Hartwich | | 244/200 |
| 5,263,667 A * | 11/1993 | Horstman | | 244/209 |
| 5,366,177 A * | 11/1994 | DeCoux | | 244/201 |
| 6,050,523 A * | 4/2000 | Kraenzien | | 244/123.1 |
| 6,866,233 B2 * | 3/2005 | Patel et al. | | 244/204 |
| 7,673,832 B2 * | 3/2010 | Meister | | 244/123.1 |
| 7,735,782 B2 * | 6/2010 | Kloker et al. | | 244/209 |
| 7,866,609 B2 * | 1/2011 | Parikh | | 244/209 |
| 8,695,915 B1 * | 4/2014 | Jones et al. | | 244/1 N |
| 2004/0129839 A1 * | 7/2004 | Patel et al. | | 244/204 |

(Continued)

FOREIGN PATENT DOCUMENTS

EP    0 532 093    3/1993
GB    2 402 196    12/2004

(Continued)

OTHER PUBLICATIONS

Search Report for GB 1114433.4 dated Nov. 30, 2011.

*Primary Examiner* — Joseph W Sanderson
(74) *Attorney, Agent, or Firm* — Nixon & Vanderhye P.C.

(57) ABSTRACT

A wing including an airfoil section and having a leading edge, a trailing edge, an upper surface and a lower surface, wherein a region within the airfoil section adjacent the leading edge is ventilated to establish a sub-static pressure in that region during flight. Vents in the upper surface of the wing provide the ventilation.

15 Claims, 5 Drawing Sheets

(56) References Cited

U.S. PATENT DOCUMENTS

| | | | |
|---|---|---|---|
| 2007/0029450 A1* | 2/2007 | Kloker et al. | 244/204 |
| 2007/0221788 A1* | 9/2007 | Meister | 244/208 |
| 2008/0272241 A1* | 11/2008 | Brulhart | B62D 37/00 244/200.1 |
| 2008/0283665 A1* | 11/2008 | Rouyre | 244/119 |
| 2009/0014592 A1* | 1/2009 | Zha | B64C 21/025 244/199.4 |
| 2009/0212165 A1 | 8/2009 | Parikh | |
| 2009/0266937 A1* | 10/2009 | Frankenberger et al. | 244/209 |
| 2010/0074758 A1 | 3/2010 | Rawdon et al. | |
| 2010/0116943 A1* | 5/2010 | Meister | 244/208 |
| 2010/0126281 A1* | 5/2010 | Cosentino | 73/802 |
| 2010/0294892 A1* | 11/2010 | Syassen | 244/209 |
| 2011/0108672 A1* | 5/2011 | Shmilovich | B64C 9/18 244/207 |
| 2012/0037760 A1* | 2/2012 | Koppelman et al. | 244/209 |
| 2013/0175402 A1* | 7/2013 | Voege | 244/209 |

FOREIGN PATENT DOCUMENTS

| | | | | |
|---|---|---|---|---|
| GB | 2508023 A * | 5/2014 | | B64C 21/04 |
| WO | WO 2007/007108 | 1/2007 | | |
| WO | 2009/023354 | 2/2009 | | |

* cited by examiner

WING LEADING EDGE VENTING

This application is the U.S. claims priority to GB 1114433.4 filed 22 Aug. 2011, the entire contents of each of which are hereby incorporated by reference.

FIELD OF THE INVENTION

The present invention relates to a wing having a vented leading edge region.

BACKGROUND OF THE INVENTION

Natural Laminar Flow (NLF) on an aerodynamic surface requires a high quality surface finish if premature transition is to be avoided. The presence of waviness, roughness, gaps and steps in the surface can be a challenge in meeting the surface quality criteria.

In the case of an aircraft wing, waviness is one property that is significantly dependent upon flight loads and the wing skin must be sized to meet stringent deflection criteria at cruise conditions.

Typically, the internal leading edge region of an aircraft wing is vented to remove fumes (e.g. from the aircraft internal wing fuel tanks) and water build up.

The skin panel of a wing leading edge traditionally is held in place by leading edge ribs and the skin thickness is sized to account for bird strike requirements. For the particular application of Natural Laminar Flow (NLF) strict control of the surface waviness is required to avoid premature transition.

If the leading edge region is vented on the wing lower (high pressure) surface, as is normal, the internal pressure within the leading edge region at cruise conditions is such as to cause a significant pressure load across the skin panel which in part defines the wing upper (low pressure) surface of the leading edge. This leads to excessive waviness and premature transition. A typical solution is to increase the thickness of the wing skin but this incurs a significant weight penalty.

SUMMARY OF THE INVENTION

A first aspect of the invention provides a wing comprising at least one aerofoil section and having a leading edge, a trailing edge, an upper surface and a lower surface, wherein a region within the aerofoil section immediately adjacent the leading edge is ventilated so as to establish a sub-static pressure in that region during flight.

A further aspect of the invention provides a method of operating a wing, the wing comprising at least one aerofoil section and having a leading edge, a trailing edge, an upper surface and a lower surface, and the method comprising ventilating a region within the aerofoil section immediately adjacent the leading edge so as to establish a sub-static pressure in that region during flight.

For the avoidance of doubt, the term "sub-static pressure" refers to a pressure below the free stream static (or atmospheric) pressure encountered by the wing.

The invention is advantageous in that the internal wing leading edge region observes a much lower pressure than in the case where that region is vented to the lower (high pressure) surface. The pressure differential between the internal wing leading edge region and the wing upper surface during flight is therefore greatly reduced.

The aerofoil section may be configured for natural laminar flow.

Preferably, the aerodynamic load due to this pressure differential is such that only waviness in the wing upper surface due to manufacturing and assembly need to be considered as critical for natural laminar flow conditions.

The leading edge region may be ventilated via one or more vents which open in the upper surface. The upper (low pressure) surface may be beneficially used as the source of the sub-static pressure in the leading edge region. Depending on the location of the vent(s) in the upper surface it may be possible to reduce the pressure differential between the internal wing leading edge region and the wing upper surface during flight to substantially zero.

The vent opening(s) may be substantially flush with the upper surface. Alternatively, the vent opening(s) may be proud of the upper surface. The vents may be sized to maintain at least a minimum ventilation flow rate in the wing leading edge region to provide a required change of air rate within that region during flight.

The wing according may further comprise a front spar which, in part, bounds the leading edge region, and wherein the vent opening(s) are disposed forward of the front spar.

The vent opening(s) may be disposed at location(s) on the upper surface where the airflow is predominantly turbulent during flight.

The vent opening(s) may be disposed adjacent the root and/or the tip of the wing.

The upper surface adjacent the leading edge may comprise a plurality of panels arranged spanwise across the wing, and a chordwise joint between adjacent panels being responsible for a substantially wedge shaped region where turbulent flow develops over the upper surface during flight, and the vent opening(s) may be disposed within the turbulent wedge region(s). The discrete turbulent wedge regions enable the vent opening(s) to be positioned favourably without the addition of further drag penalties.

The wing may further comprise one or more leading edge flaps (Krueger flaps). These are high lift devices deployable from the wing lower surface.

The invention may also provide an aircraft including the wing according to the invention.

The aircraft may further comprise a belly fairing between a fuselage and the wing, and the leading edge region may be ventilated via one or more vents which open in the belly fairing.

In the method of this invention, the leading edge region may be ventilated such that a pressure differential across a panel defining the upper surface at the leading edge causes a maximum outward deflection of the panel of less than approximately 2 mm, and preferably less than approximately 1 mm, during flight.

The leading edge region may be ventilated during cruise.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
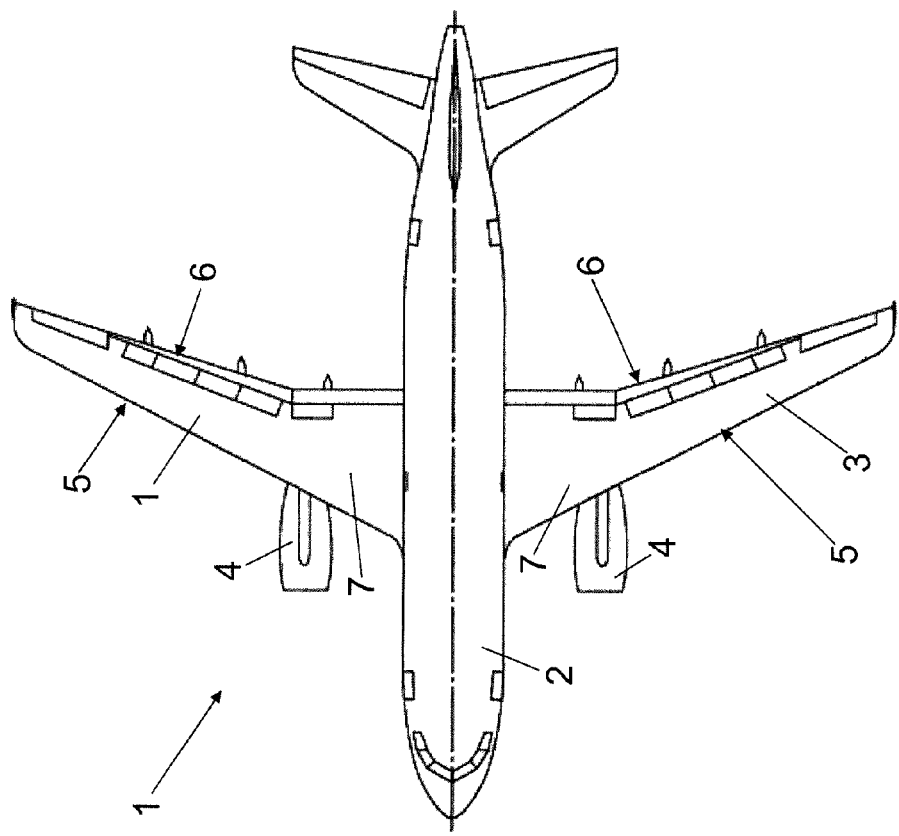
FIG. 1 illustrates a plan view of an aircraft having a wing configured for natural laminar flow (NLF)

FIG. 1 illustrates a plan view of a transport aircraft 1. The transport aircraft 1 may be used for commercial passenger or freight operations, however this invention is also applicable to any transport aircraft including those suitable for military use. The aircraft 1 has a fuselage 2, a wing 3 and under-wing mounted engines 4. The wing 3 of the aircraft 1 is a low wing, however it will be appreciated that this invention is equally applicable to aircraft having a high mounted wing. The engines 4 shown in FIG. 1 are mounted beneath the wing 3 but it will be appreciated that the number and location of the engines may be varied depending upon the aircraft. For example, the engines may be mounted to the rear fuselage, either directly, or upon support booms.

The aircraft 1 has a wing comprising at least one aerofoil section configured for natural laminar flow. A natural laminar flow aerofoil wing is configured to generate a significant extent of laminar flow on the upper wing surface through favourable pressure gradients, and without active boundary layer control. Although this invention is not exclusively concerned with natural laminar flow aerofoils and wings, it has particular to these. According to another embodiment, the aircraft may have a turbulent wing.

Figure 2:
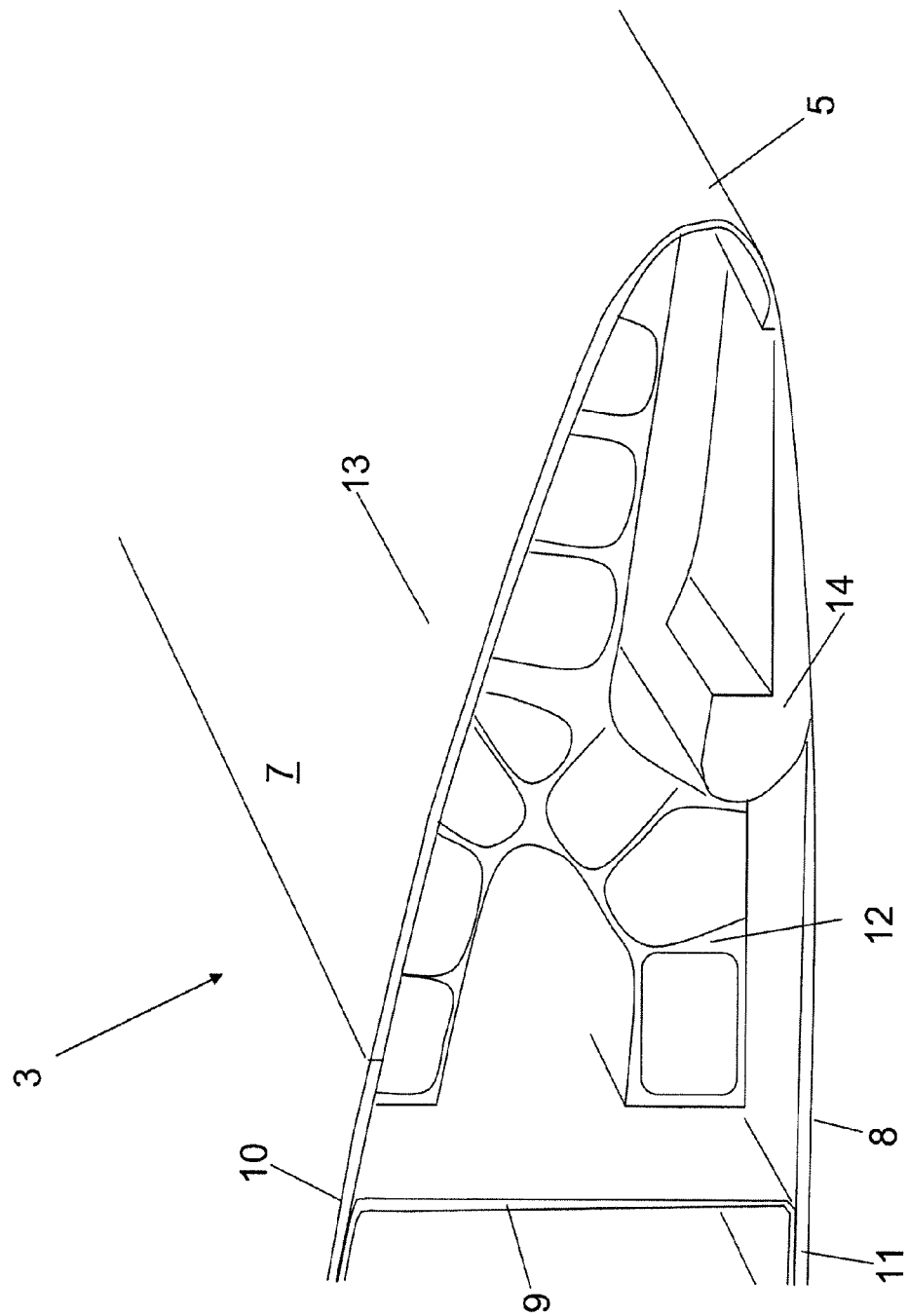
FIG. 2 illustrates a partial section view through a leading edge region of the aircraft wing, showing a lead edge Krueger flap in its stowed position.

FIG. 2 illustrates a partial section view through a leading edge region of the aircraft wing 3. The wing 3 has a leading edge 5, a trailing edge 6, an upper surface 7 and a lower surface 8. The upper surface 7 extends between the leading edge 5 and the trailing edge 6, and the lower surface 8 extends between the leading edge 5 and the trailing edge 6. The wing 3 includes a front structural spar 9, which forms part of a wing box structure of the wing 3. The front spar 9 extends in the spanwise direction across the wing.

The wing box structure further comprises an upper wing cover 10 and a lower wing cover 11. The front spar 9 may be attached to, or integrally formed with, the upper wing cover 10 and the lower wing cover 11. A plurality of forward ribs, such as the forward rib 12 visible in FIG. 2, extends forwardly from the front spar 9 and supports a "D-nose" panel 13. An outer surface of the D-nose panel 13 lies substantially flush with an outer surface of the upper wing cover 10 and together form part of the upper surface 7 of the wing 3. Similarly, an outer surface of the lower wing cover 11 forms part of the lower surface 8 of the wing 3.

A leading edge Krueger flap 14 is shown in FIG. 2 in its stowed position. The Krueger flap 14 is moveable from its stowed position and rotates forwardly from the wing lower surface to a deployed position forward of the wing leading edge 5 to increase the wing lift coefficient at low speed. The Krueger flap 14 is moveable between its stowed and deployed positions by means of an actuator mechanism, not shown in FIG. 2. The leading edge Krueger flap 14 has particular synergy with the natural laminar flow wing 3 since the wing upper surface remains substantially "clean", i.e. as free as possible from gaps, steps etc, that can occur with other leading edge high lift devices such as slats. However, it will be appreciated that Krueger flaps can also be used beneficially in combination with turbulent flow wings.

As can best be seen from FIG. 2, when the Krueger flap 14 is in its stowed position an enclosed volume is defined within the aerofoil section immediately adjacent the leading edge 5. This region is bounded by the front spar 9, the upper wing cover 10, the D-nose panel 13, the lower wing cover 11, and the Krueger flap 14. It will be appreciated that the Krueger flaps may not extend across the entire leading edge of the wing, and in those regions without flaps the enclosed volume within the aerofoil profile immediately adjacent to the leading edge 5 will be bounded by a lower cover panel of conventional type (not shown).

As is common within many aircraft, at least some of the interior volume within the wing 3 is used as an internal fuel tank for carrying (liquid) fuel for the engines 4. Whilst the fuel tanks are, of course, intended to be fluid tight, some migration of fuel vapours inevitably can occur into other regions within the wing profile outside of the fuel tanks. It is commonplace that the front spar defines a forward boundary of the internal wing fuel tanks, and in the wing 3 shown in FIG. 2 the front spar 9 also performs this function. Since the front spar 9 forms part of the fuel tank boundary, and since the enclosed leading edge region lies on the other side of that boundary, it is necessary to ventilate the enclosed leading edge volume to prevent build-up of any fuel vapours and also to purge any water which may inadvertently collect within this enclosed volume.

Figure 3:
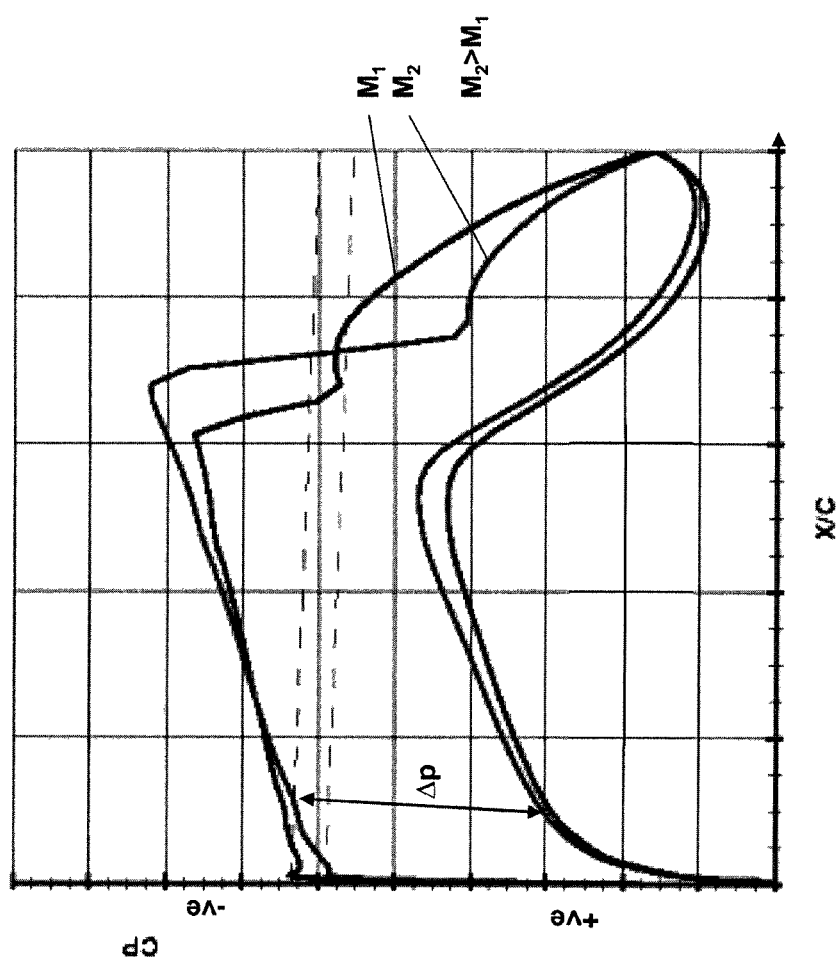
FIG. 3 illustrates a schematic pressure plot over a NFL aerofoil of the wing at two different cruise Mach numbers.

FIG. 3 illustrates a typical pressure distribution around a natural laminar flow aerofoil at cruise conditions for two different Mach numbers, $M_1$ and $M_2$, where $M_2$ is greater than $M_1$. As can be seen from the schematic pressure distribution of FIG. 3, the pressure coefficient over the wing lower surface 8 in the leading edge region is predominantly positive, whereas the pressure coefficient over the upper wing surface 7 in the leading edge region is significantly negative.

For the next generation of natural laminar flow wings it is been proposed to ventilate the enclosed volume within the wing leading edge region by providing a duct in the wing lower surface 8. The rationale being that the upper wing surface 10 can be maintained substantially free of openings, gaps and steps which can promote premature transition of the natural laminar flow over the upper wing surface. As can be seen from FIG. 3, depending on the aerofoil section used, it may be possible to achieve natural laminar flow over at least 60% of the upper wing surface at cruise conditions by maintaining a favourable pressure gradient and avoiding premature transition.

However, if the enclosed leading edge region of the wing is ventilated on the wing lower surface, the internal pressure in the leading edge region at cruise conditions will be such as to cause a significant pressure load across the structures defining the upper wing surface 7 near the leading edge 5, such as the D-nose panel 13. This pressure differential is illustrated by $\Delta P$ in FIG. 3. This positive pressure acts outwardly on the upper wing surface 7 and causes an effect known as "quilting" whereby the upper wing skin (e.g. the D-nose panel 13) tends to bow outwardly in between the spaced forward ribs 12 which support the relatively thin panels defining the aerofoil profile. This quilting effect can lead to excessive waviness in the upper wing surface 7 which can cause premature transition of the laminar flow. The usual solution would be to increase the thickness of the panels defining the upper wing surface so as to increase their stiffness but this incurs a significant weight penalty, as the aerodynamic loading would likely be the critical load over and above the structural loads observed by the panel.

According to the invention, the enclosed leading edge region is ventilated so as to establish a sub-static pressure within that region. By reducing, or possibly even eliminating, the pressure differential across the panels defining the upper wing surface 7 at the leading edge it becomes possible to reduce the quilting effect and maintain the deflection of the upper wing surface 7 to within a predetermined limit such that premature transition does not occur. Waviness/quilting in the upper wing surface of as little as approximately 2 mm may be sufficient to cause premature transition, and so the maximum permissible deflection under load during cruise would need to be less than this.

If the pressure differential across the D-nose panel 13 can be reduced such that the panel thickness need be no greater than that required to account for structural loads, e.g. for bird strike requirements, whilst maintaining the maximum surface deflection within predetermined waviness limits, then a weight optimised structure can result.

There are several low pressure regions over an aircraft's surface which may be used to ventilate the enclosed wing leading edge region. For example, the wing-fuselage belly fairing may have low pressure surface regions which may be tapped to provide appropriate ventilation for the enclosed wing leading region. However, the ducting required to ventilate the enclosed wing leading edge region adjacent the wing tip 15 may carry a significant weight penalty.

A preferred source of low pressure air for ventilating the enclosed wing leading edge region is the upper wing surface 7, contrary to what may be expected for a laminar flow wing. As can be seen from the pressure distribution for the aerofoil section shown in FIG. 3, if the upper wing surface is used as the ventilation source then the pressure differential across the upper wing surface may be virtually eliminated.

Figure 4:
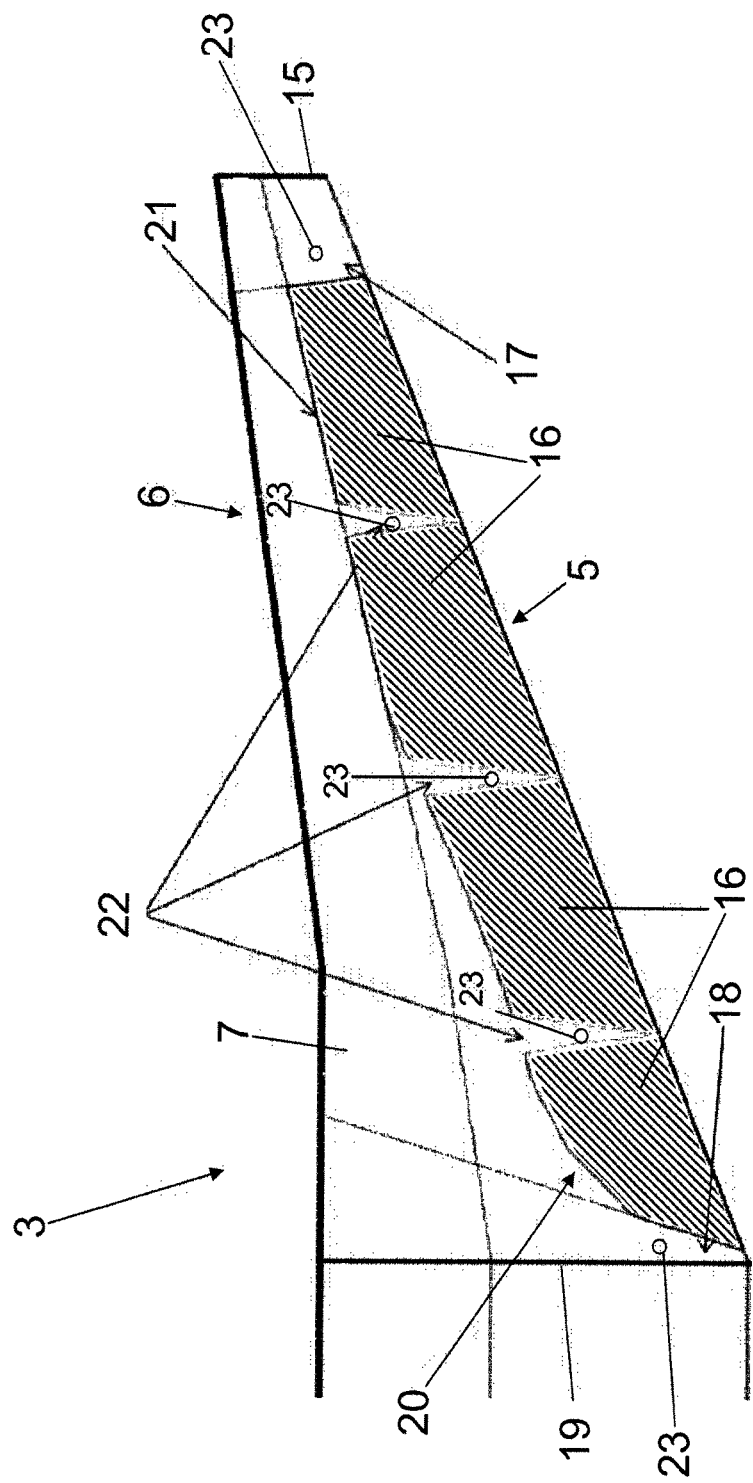
FIG. 4 illustrates a schematic plan view of the NLF wing, showing the regions of laminar and turbulent flow at cruise, and locations of ducts for venting the wing leading edge region.

In the design of a natural laminar flow wing, such as the wing 3, effort is made to ensure that the regions of laminar flow over the wing surfaces are as expansive as possible at cruise optimised conditions. FIG. 4 illustrates regions of laminar flow 16 (hashed shading) over the upper surface of the wing 3. As can be seen, the regions of natural laminar flow 16 extend aft from the wing leading edge 5.

The regions of natural laminar flow 16 are bounded due to a variety of constraints. In a region 17 adjacent to the wing tip 15, the flow over the upper surface 7 is turbulent as wing tip flow characteristics prevent the formation of a favourable pressure gradient conducive to natural laminar flow. Similarly, a wing root region 18 adjacent the wing root 19 at the wing/fuselage boundary is turbulent over the upper wing surface 7 for the same reason.

The aft boundary of the laminar flow regions 16 is typically limited by one of two effects. The first of these concerns the local aerofoil profile which can sustain natural laminar flow due to the formation of a favourable pressure gradient up to approximately 30% to approximately 60% of the local wing chord. This pressure gradient limited transition is indicated by line 20. The second effect is the location of a shock at line 21 which will cause the laminar flow to transition to turbulent flow even where the aerofoil profile may otherwise by conducive to a favourable pressure gradient. As can be seen from FIG. 4, the shock limited transition line 21 tends towards the pressure gradient limited transition line 20 in the outboard direction.

Towards the wing tip 15, in the absence of shock limited transition, the aft limit of the laminar flow regions 16 may also be bounded by the forward edge of trailing edge flight control surfaces, typically spoilers. The forward edge of the spoilers will typically provide a sufficient gap or step in the upper wing surface to cause transition if this has not already occurred in the upstream direction.

Finally, the regions of laminar flow 16 are bounded by turbulent regions due to gaps in the outer wing surface. As can be seen in FIG. 4, the wing 3 has three generally wedge shaped turbulent regions 22 having their apex at the wing leading edge 5. Chordwise structural joints between adjacent wing panels at the wing leading edge 5 provide a gap that may be sufficient to cause the turbulent wedge shaped regions 22 extending in the aft direction. Whilst it is, of course, desirable to keep the turbulent wedges 22 to a minimum, manufacturing considerations make it difficult, if not impossible, to eliminate these entirely. The number of these turbulent wedges will depending on manufacturing and other design constraints for each wing.

As can be seen from FIG. 4, the turbulent regions such as the tip region 17, the root region 18 and the turbulent wedges 22 may provide suitable locations for one or more ducts for venting the enclosed wing leading edge region. Since these regions are already turbulent, positioning the ducts in these turbulent regions does not adversely impact upon the wetted area of the laminar flow regions 16. In the schematic view illustrated in FIG. 4, ducts 23 are disposed at each of the turbulent regions 17, 18 and 22. However, it will be appreciated that the number of ducts 23 will vary depending on the characteristics of the wing and the required venting of the enclosed wing leading edge region. Any number of ducts 23, including one, may be provided.

Depending upon the design of the ducts 23, the parasitic drag penalty due to the duct opening in the outer aerodynamic surface of the wing may be almost independent of whether the duct opening is in the upper or lower wing surface.

Accordingly, it becomes possible to vent the enclosed wing leading edge region at a sub-static pressure without adversely impacting upon the parasitic drag or reducing the applicable natural laminar flow regions over the upper wing surface, whilst benefiting from the weight saving of using a relatively thin upper wing skin in the leading edge region.

Figure 6:
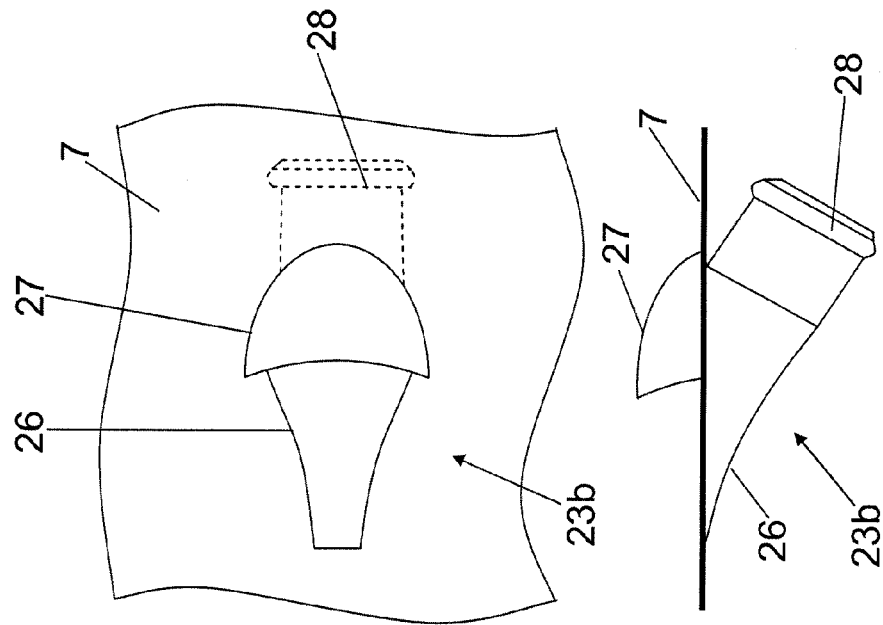
FIGS. 6a and 6b illustrate schematic plan and section views of an alternative NACA duct having a proud cowl fitted to the upper wing surface for venting the wing leading edge region.
Figure 5:
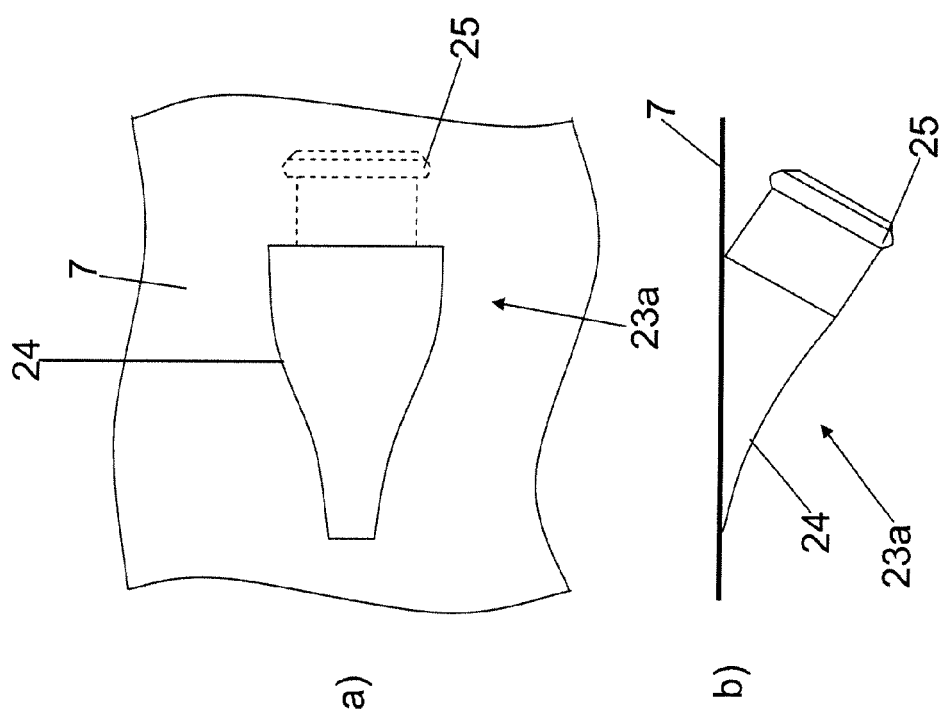
FIGS. 5a and 5b illustrate schematic plan and section views of a submerged NACA duct fitted to the upper wing surface for venting the wing leading edge region.

FIGS. 5 and 6 illustrate two possible designs for the ducts 23 in the upper wing surface 7. In the first design, depicted in FIGS. 5*a* and 5*b*, the duct 23*a* comprises a submerged NACA duct 24 of standard type. The NACA duct 24 is connected to pipe way 25 which may either be used to ventilate the enclosed wing leading edge region directly, or may be connected to additional pipework (not shown) depending upon the location of the duct 23*a* with respect to the region(s) being ventilated.

FIGS. 6*a* and 6*b* illustrate a second alternative design of the duct 23*b* which also comprises a submerged NACA duct 26 but is additionally provided with a cowl 27 extending proud from the upper wing surface 7. The duct 23*b* may further comprise similar pipework 28.

The duct 23*a* and 23*b* illustrated in FIGS. 5 and 6 are purely exemplary and it will be appreciated that virtually any suitable submerged, or proud, duct design may be used for ventilating the enclosed wing leading edge region. For example, an alternative duct may be proud from the surface as might be used on an engine nacelle 'breather' duct.

At cruise, the vents 23 would experience only minor flow rates and would be sized to enable the required change of air rate for the enclosed wing leading edge region in general. Of course, in order to ventilate the enclosed wing leading edge region as well as the ducts 23, another vent (not shown) may also be required to enable the through flow of air. The ducts 23 may operate as an outlet as they open in a low pressure region, and so one or more separate inlets may be required at another location. The inlet may be positioned in a variety of locations, e.g. in the lower wing surface, belly fairing etc.

Although the invention has been described above with reference to one or more preferred embodiments, it will be appreciated that various changes or modifications may be made without departing from the scope of the invention as defined in the appended claims.

The invention claimed is:

1. A wing comprising:
   an airfoil section including a leading edge, a trailing edge, an upper surface and a lower surface,
   wherein a region within the airfoil section immediately adjacent the leading edge is ventilated via one or more vent openings which open in the upper surface to establish a sub-static pressure in the region during flight and the sub-static pressure is immediately adjacent the leading edge, wherein the region within the airfoil section is bounded, in a chordwise direction, by a front spar of the wing and a nose panel of the wing, and wherein the one or more vent openings are configured to discharge a gas from within the airfoil section into a predominately turbulent air flowing over the vent openings in the upper surface during flight, and
   each of the one or more vent openings are disposed at one or more locations on the upper surface where airflow is predominantly turbulent during flight.

2. The wing according to claim 1, wherein the vent opening is flush with the upper surface.

3. The wing according to claim 1, further comprising a front spar which is adjacent the leading edge, and wherein the one or more vent openings are disposed forward of the front spar.

4. The wing according to claim 1, wherein the wing includes a root and a tip, and at least some of the one or more vent openings are adjacent at least one of the root and the tip.

5. The wing according to claim 1, wherein the upper surface adjacent the leading edge comprises:
   a plurality of panels arranged span-wise across the wing;
   a chord-wise joint between adjacent ones of the plurality of panels;
   a substantially wedge shaped region on one or more upper surfaces of the plurality of panels, wherein the substantially wedge shaped region is aligned with the cordwise joint and wherein turbulent flow develops in the substantially wedge shaped region during flight, and
   at least some of the one or more vent openings are disposed within the turbulent wedge region.

6. The wing according to claim 1, further comprising one or more leading edge flaps.

7. The wing according to claim 1, wherein the at least one airfoil section is configured for natural laminar flow.

8. An aircraft including the wing according to claim 1.

9. The wing of claim 1 wherein the region within the airfoil section is between a forward rib and a root of the wing in a spanwise direction of the wing.

10. An aircraft comprising:
    a wing comprising an airfoil section including a leading edge, a trailing edge, an upper surface and a lower surface, wherein region within the airfoil section immediately adjacent the leading edge is ventilated via one or more vent openings which open in the upper surface to establish a sub-static pressure in the region during flight, and wherein the one or more vent openings are configured to discharge a gas from within the airfoil section into a predominately turbulent air flowing over the vent openings in the upper surface during flight, and each of the one or more vent openings are disposed at one or more locations on the upper surface where airflow is predominantly turbulent during flight, and
    a belly fairing between a fuselage and the wing, and wherein the leading edge region is ventilated via one or more ducts in fluid communication with the belly fairing.

11. A method of venting a wing, the wing comprising an airfoil section and having a leading edge, a trailing edge, an upper surface and a lower surface, and the wing includes a region within the airfoil section, immediately adjacent the leading edge, and between a front spar and a nose panel of the wing, the method comprising:
    ventilating the region within the airfoil section immediately adjacent the leading edge through vent openings in the upper surface, wherein the ventilation includes moving gas within the airfoil section through the vent openings and into a predominately turbulent air flowing over the vent openings in the upper surface during flight; and
    the ventilation establishes a sub-static pressure in the region within the airfoil section during flight, wherein the sub-static pressure occurs at least immediately adjacent the leading edge.

12. The method according to claim 11, wherein the region is ventilated during a cruise portion of flight of an aircraft having the wing.

13. The method according to claim 11, wherein the at least one airfoil section is configured to have a portion of the upper surface adjacent natural laminar flow and another portion of the upper surface adjacent predominately turbulent air, and the vent openings are in the another portion of the upper surface.

14. The method of claim 11 wherein the region within the within the airfoil section is between a forward rib and a root of the wing in a spanwise direction of the wing.

15. A method of venting a wing, the wing comprising at least one airfoil section and having a leading edge, a trailing edge, an upper surface and a lower surface, and the method comprising:
    ventilating a region within the airfoil section immediately adjacent the leading edge through vent openings in the upper surface, wherein the ventilation includes moving gas within the airfoil section through the vent openings and into a predominately turbulent air flowing over the vent openings in the upper surface during flight,
    wherein the ventilation establishes a sub-static pressure in the region within the airfoil section during flight, and
    wherein the ventilation creates that a pressure differential across a panel defining the upper surface at the leading edge that causes a maximum outward deflection of the panel of less than 2 mm, during flight.

* * * * *